E. AMBLER.
8558½X
Mowing Machine.
Patented Dec. 23, 1834.
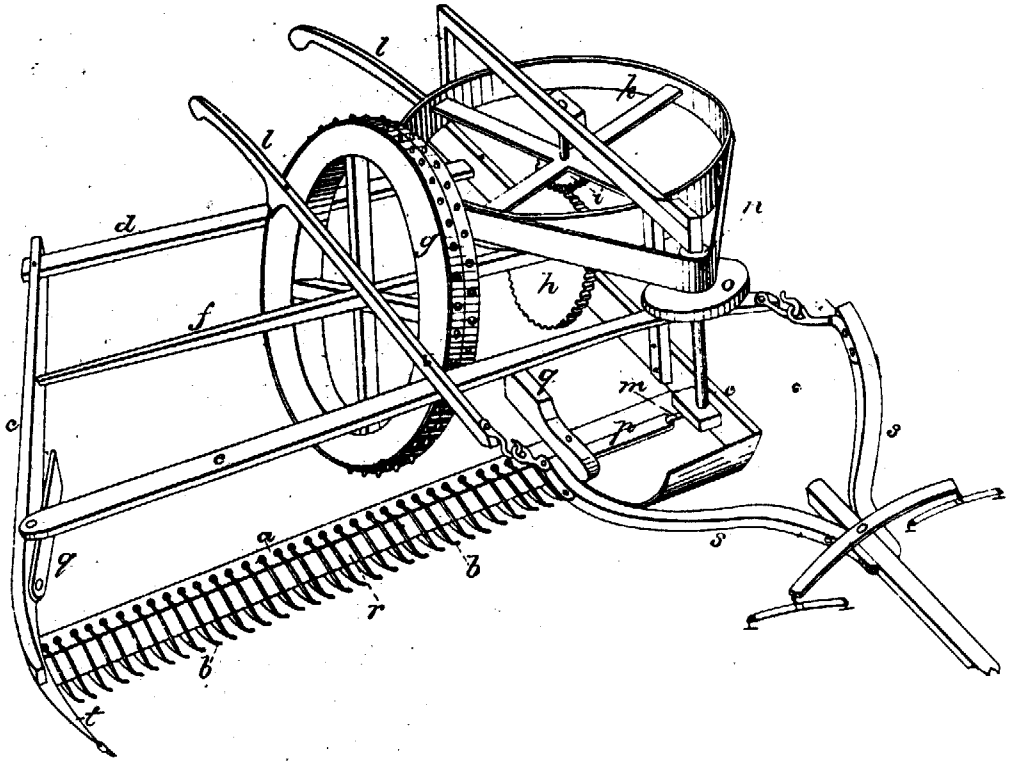

8558½X

UNITED STATES PATENT OFFICE.

ENOCH AMBLER, OF ROOT, NEW YORK.

IMPROVEMENT IN MACHINES FOR CUTTING HAY AND GRAIN.

Specification forming part of Letters Patent dated December 23, 1834.

*To all whom it may concern:*

Be it known that I, ENOCH AMBLER, of Root, county of Montgomery, and State of New York, have made and invented a Machine for Cutting Hay and Grain, the said machine propelled by horse-power.

The following is a description, viz: Length of main bar is seven feet; width, two and one-half inches; thickness, three-fourths inch; bevel from front edge on the under side, one and one-fourth inch, containing thirty teeth eight inches long with beards four inches; space between teeth and beard, five-eighths inch in front, and next to main bar three-eighths inch, the teeth running in a horizontal line from main bar four inches, thence rising in a circular form two inches above said line; space between guards, five feet six inches, and the above-named teeth are equally divided between said guards. The left guard in front of main bar is one foot one and one-half inch wide, one foot nine inches long, rising in a circular form one foot above a horizontal line; top of said guard, ten inches; length of right-hand guard, one and one-half foot; width in front of main bar, six inches, running to a point and rising in a circular form five inches above a horizontal line, with a fender commencing in a socket on said guard three inches from the point and rising ten inches above main bar, thence running on said side piece three and a half inches, and fastened with a bolt and screw. Arms attached to main bar are two feet long, one and three-fourths inch wide, one-half inch thick, fastened on the under side of side pieces with bolts and screws.

The above is wholly composed of iron.

The length of the left-hand side is six feet two inches, one and three-fourths inch thick; back cross-bar, four feet nine inches long, two by four inches, placed six inches from the back end; length of front cross-bar, eight feet four inches, extending beyond the left-hand side piece one foot five inches; left end, two and one-half inches; width over left side piece, four and one-half inches; width at right hand, two and one-half inches, and two inches thick, fastened on the upper side of left-side piece and to the fender on the right hand with bolts, front edge of said cross-bar placed perpendicular with front edge of main bar. Length of shaft is five feet; size at driving-wheel, four and one-fourth inches; right hand, two and one-half inches; left hand against face-wheel, four and one-fourth inches; size extending through face-wheel, three and one-half inches. Said face-wheel is nineteen and one-half inches in diameter; thickness of main body three-eighths inch, made of cast-iron, containing fifty-six cogs; spur-wheel, four and one-half inches in diameter, one and one-eighth inch thick, containing thirty cogs, which mesh in said face-wheel. Length of cogs is seven-sixteenths inch; length of spindle through band and spur wheel, one foot four inches from shoulder to shoulder; tenon of spindle at lower end, five-eighths inch in diameter and one inch long; tenon at the upper end, one-half in diameter and one and one-half inch long; size of spindle, one inch square; the spur-wheel, placed three inches from the lower end of the spindle-band wheel, two feet eleven inches in diameter; rim, four and one-half inches wide, three-eighths inch thick, the fellies two inches wide, one and one-fourth inch thick; two arms, two feet ten inches long, two and one-half by two. The driving-wheel is three feet in diameter, fellies three and one-half inches wide, two and three-fourths inches deep. Said wheel is hooped with band-iron one-eighth inch thick, containing fifty-six spikes; holes one-half inch square, placed in two rows two inches apart, each spike standing in the center of the opposite row, said spikes three inches long, extending one and one-fourth inch above the surface of the wheel, one inch broad at the shoulder, terminating at a point in an oval form; tenon to the same, one and three-fourths inch long and one-half inch square, two arms extending across the center, four inches wide at the shoulder and six and one-half inches at the center. Length of the front pillow is two feet four inches, two and one-half by two. Length of back pillow is two feet two inches, two by two; top piece on pillow, five feet eleven inches, two by two; at each end, five inches wide over the center of the band-wheel; handles, ten feet long, two and one-fourth by two and one-fourth inches, and fastened with bolts to the forward and back cross-bars. Length of crank from shoulder to shoulder is one foot eight inches; length below the shoulder, three and one-half inches, including room for a two-inch box and a pitman; said crank three-fourths inch diameter, square five inches from upper shoulder, and the remainder round. Balance-wheel on crank is eleven inches in diameter, one and one-half inch thick; whur, four and three-fourths inches in diameter and three and one-half inches wide; balance-wheel placed at the top shoulder of the crank, and the whur directly under it; pitman, nine inches long, one and one-eighth inch wide, and seven-eighths inch thick; left hinge, one foot one inch long, nine inches wide at back end, three inches in front; mortise through said hinge, two and one-half inches long, one inch wide for the pitman; front edge, one and one-half inch from the end; main body of said hinge composed of wood and strapped iron, one inch wide, one-eighth inch thick, one foot in length. Commencing near the bolt, running through the scythe and pitman around front end of said hinge, the said hinge is supported by an iron running back from main bar six inches, one and three-fourths inch wide, half inch thick, holding a perpendicular bolt nine inches in length, three-fourths inch in diameter. Right-hand hinge is of the same description as the left, excepting the mortise for the pitman. Said hinges contain bolts three and one-half inches long, three-eighths inch in diameter; heads, five-eighths inch wide, one and three-fourths inch long, one-eighth thick, which fasten said scythe. The bolts are fastened with wood-screws containing a head one and one-fourth inch long, one-half inch in width, and so placed as to turn off and on to the head of said bolts. The scythe is six feet one inch in length, two and one-half inches wide; back, one-fourth inch thick, and the back is so placed at front edge of main bar over the teeth and under the beard, the scythe containing holes one-half inch from each end, three-eighths inch in diameter, one and one-fourth inch from front edge; scythe and main bar straight. The thills are attached to the front cross-bar, with hooks and eyes eight feet and eight inches long; cross-bar on said thills, three feet five inches long, ten inches wide, and one and one-fourth inch thick, the clutch between the sills running parallel with the clutch of the left guard. Main shaft is hung two and one-half feet from back end of side pieces and thirteen inches from under side.

ENOCH AMBLER.

Witnesses:

JOHN BONDIST,

JOB B. HOAG.